United States Patent [19]

Beresniewicz et al.

[11] Patent Number: 4,775,715

[45] Date of Patent: Oct. 4, 1988

[54] DRY BLENDING PROCESS FOR THE QUATERNIZATION OF POLYVINYL ALCOHOL

[75] Inventors: Aleksander Beresniewicz; Thomas Hassall, Jr., both of Wilmington, Del.

[73] Assignee: E. I. Du Pont de Nemours and Company, Wilmington, Del.

[21] Appl. No.: 76,727

[22] Filed: Jul. 23, 1987

[51] Int. Cl.$^4$ ................................................ C08F 8/00
[52] U.S. Cl. ................................... 525/61; 525/359.3; 525/369; 525/374
[58] Field of Search ...................... 525/61, 359.3, 369, 525/374

[56] References Cited

U.S. PATENT DOCUMENTS

| | | | |
|---|---|---|---|
| 3,121,607 | 2/1964 | Ohno et al. | 525/61 |
| 3,684,784 | 8/1972 | Marze | 525/61 |
| 3,685,953 | 8/1972 | Cuvelier et al. | 8/115 |
| 3,959,406 | 5/1976 | Tsuji et al. | 525/61 |
| 4,109,068 | 8/1978 | Allen | 526/9 |
| 4,127,563 | 11/1978 | Rankin et al. | 536/50 |
| 4,182,804 | 1/1980 | Serboli et al. | 525/61 |
| 4,281,109 | 7/1981 | Jarowenko et al. | 536/50 |
| 4,308,189 | 12/1981 | Moritani et al. | 260/29.6 |
| 4,311,805 | 1/1982 | Moritani et al. | 525/61 |
| 4,645,794 | 2/1987 | Davis et al. | 525/61 |

FOREIGN PATENT DOCUMENTS 52-3689  1/1977  Japan .

*Primary Examiner*—Joseph L. Schofer
*Assistant Examiner*—J. M. Reddick

[57] ABSTRACT

Cationic polyvinyl alcohol is prepared by blending polyvinyl alcohol under high shear conditions, at 0°–100° C., with a small amount of water, a small excess of base, and a quaternizing agent containing a halohydrin radical and a quaternary ammonium group. The quaternization proceeds with acceptable conversions of about 35 to well over 50%. The quaternized polyvinyl alcohol has many applications, including use as a flocculating agent, as a stabilizing colloid, and in adhesive formulations.

12 Claims, No Drawings

DRY BLENDING PROCESS FOR THE QUATERNIZATION OF POLYVINYL ALCOHOL

BACKGROUND OF THE INVENTION

This invention relates to a process for the quaternization of polyvinyl alcohol (sometimes, hereinafter referred to as PVA) to a polymer having cationic groups. That product usually is known as cationic polyvinyl alcohol (or cationic PVA).

Two basic processes for preparing cationic PVA are known. The first is a two-step process which involves, first, copolymerization of vinyl acetate with a comonomer containing a quaternary ammonium group and, next, hydrolysis of acetate groups to hydroxyl groups. The second requires post-treatment of PVA.

Representative of the first type of PVA quaternization processes are U.S. Pat. Nos. 4,311,805 and 4,308,189 to Tohei at al., which disclose copolymerization of vinyl acetate with cationically substituted acrylamides and methacrylamides.

U.S. Pat. No. 4,109,068 to Allen teaches copolymerization of vinyl acetate with a vinyl haloacetate, which then is partially saponified and quaternized through the remaining halovinyl acetate groups.

Representative of the second type of PVA quaternization processes is Japanese Pat. No. 52-3689 to Yokkaichi, which discloses a process for post-quaternization of PVA in a slurry of acetone or other organic liquid, optionally containing water.

U.S. Pat. 4,645,794 discloses a process for the post-quaternization of PVA in an aqueous solution or an aqueous slurry, using as the quaternizing agent (chlorohydroxypropyl)trimethylammonium chloride.

Some of those processes, however, are not entirely satisfactory either because of the fact that they require expensive, not readily available starting materials, or involve multistep reactions, or result in rather low yields of the desired product, or require expensive purification methods such as dialysis.

It thus is desirable to provide a simple, inexpensive method of quaternizing PVA in satisfactory yields to a reasonably pure product which does not require difficult or expensive recovery or purification techniques.

BRIEF SUMMARY OF THE INVENTION

According to this invention, there is provided a process for the preparation of cationic polyvinyl alcohol, wherein dry polyvinyl alcohol powder is blended under high shear conditions at a temperature of about 0°–100° C. with an amount of water of about 5–50% of the weight of polyvinyl alcohol, a base, and a quaternizing agent represented by the following formula (1):

$$R_4-\overset{+}{N}\begin{smallmatrix}R_1\\R_2\\R_3\end{smallmatrix}\quad X^- \qquad (1)$$

in which each one of $R_1$, $R_2$, and $R_3$ is alkyl or substituted alkyl; $X^-$ is an anion; and $R_4$ is a halohydrin radical represented by formula (2):

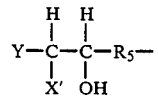

where $X'$ is a halide; $R_5$ is an alkylene radical; and $Y$ is hydrogen or an alkyl radical;

the amount of the quaternizing agent being about 0.5 to 5 equivalents of $X'$ halogen atoms per 100 equivalents of OH groups in the starting polyvinyl alcohol, and the amount of base being such that there is an excess of about 0.3 to 5 weight percent of the base, based on the amount of polyvinyl alcohol, over the amount of base required to completely convert the halohydrin radical to the oxirane form; both the starting solid polyvinyl alochol and the resulting quaternized polyvinyl alcohol remaining during the reaction essentially in the form of a free-flowing powder or granular material;

and recovering the resulting quaternized polyvinyl alcohol.

DETAILED DESCRIPTION OF THE INVENTION

While the quaternizing agent is a quaternary ammonium compound carrying a halohydrin group, it is believed that the latter is converted to an oxirane (epoxy) group, and that the oxirane group is the actual reacting species in the PVA quaternization reaction. Oxiranes of this type are rather unstable, and it is therefore preferred to prepare them in situ. The halohydrin radical preferably has 3–5 carbon atoms ($R_5$ has 1 to 3 carbon atoms), three carbon atoms being preferred.

The anion $X^-$ can be any suitable anion but normally will be hydroxyl, halide, or alkoxide, preferably a halide anion, such as chloride, bromide, or iodide.

Each of the alkyl radicals $R^1$, $R^2$, and $R^3$ individually has 1 to 8 carbon atoms, particularly 1 carbon atom. The most preferred quaternizing agent is N-(3-chloro-2-hydroxypropyl)-N,N,N-trimethylammonium chloride.

The preferred amount of the quaternizing agent is 1.5 to 2.5 equivalents of $X'$ halogen atoms of the halohydrin radical per 100 equivalents of polyvinyl alcohol hydroxyl groups.

The base which is used in the process of the present invention can be any strong base, such as an alkali metal or a quaternary ammonium hydroxide. The most convenient base, because of its ready availability and low price, is sodium hydroxide. The preferred excess of sodium hydroxide over the amount required to convert the halohydrin radical of the quaternizing agent to the oxirane form is about 1.5–2.5 weight percent, based on the weight of PVA, especially 1.7–2.0 weight percent. In order to calculate the excess of the base, it should be kept in mind that one equivalent of $OH^-$ or $OR^-$ is required to form the oxirane group from the halohydrin. Once the oxirane compound is formed, it is believed to react with the pendant OH groups of PVA as follows:

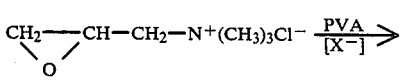

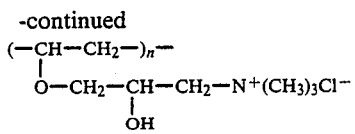

The amount of water, based on the weight of PVA, used in the process of this invention preferably is 10–15%, especially 11–13%.

Blending is carried out in high shear mixing equipment and the resulting quaternized PVA remains in the form of a free-flowing powder. The polymer can be neutralized and washed to remove the excess NaOH and quaternizing agent, or it can be used as such. It is important that all ingredients (PVA, water, base, and quaternizing agent) be intimately mixed. For the purpose of the present disclosure and claims, "high shear" means conditions such that the powder and the liquid are very efficiently dispersed in each other. Special equipment that can produce this result such as, for example, high intensity mixers, is available and generally known. An example of such equipment is the high intensity bowl type mixer known as the Wellex ® mixer.

The preferred temperature of the quaternization reaction is 25°–80° C. This parameter varies more or less inversely with time. For example, at room temperature, about the same conversion of the quaternizing agent may be obtained in 2 days as at 75° C. in 30 minutes.

Quaternized PVA made according to the process of this invention has a broad utility in many areas, e.g., as a flocculating agent, as a stabilizing colloid in the preparation of cationic polymer emulsions, in secondary oil recovery, in paper and textile sizing, in adhesive formulations, etc. It can be used in all those applications where quaternized PVA has been used heretofore.

This invention is now illustrated by representative examples of certain preferred embodiments thereof, where all parts, proportions, and percentages are by weight unless otherwise indicated. Conversions are based on the stoichiometry of the reactions.

EXAMPLES 1–39

A series of dry blends of PVA with N-(3-chloro-2-hydroxypropyl)-N,N,N-trimethylammonium chloride, available from Dow Chemical Company under the name QUAT ®-188, containing varying amounts of water and of NaOH were prepared. All weighings were carried out to ±0.01 g. The desired amount of a 20% NaOH solution was added to 10.00 g PVA and immediately mixed with a small stainless steel spatula. This mixture was then stirred for a few minutes in a Sorvall Omni mixer at 12,000 rpm, while shaking the mixer by hand to prevent cavitation. After the stirring was stopped, the contents were mixed by hand with a spatula, and the stirring at 12,000 rpm was repeated. Thereafter 1.75 g of the quaternizing agent was weighed into the PVA, mixed in by hand with a spatula, and stirred, with shaking, in the mixer. This sequence of mixing with a spatula, followed by stirring in the Sorvall mixer, was repeated twice more.

Finally, the still free-flowing mixture of PVA, NaOH, and QUAT ®-188 was ground by hand in a mortar using a porcelain pestle. The polymer was put into tightly sealed glass jars and allowed to react at ambient temperature. At given time intervals, portions of the PVA were neutralized by suspending the polymer in methanol containing a slight excess of HCl. The polymer was filtered, washed three times with a 1:3 mixture of water and methanol, followed by two washings with methanol. The polymer was dried under vacuum at 80° C. to a constant weight. The percent nitrogen was determined analytically, and the degree of quaternization was calculated.

The quaternization conditions are summarized in Table I. In these experiments the amount of water was varied, as well as the excess of NaOH, but the ratio of equivalents of quaternizing agent to —OH groups in the PVA was kept constant at 2.56/100.

TABLE I

QUATERNIZATION OF POLYVINYL ALCOHOL AT 25° C.
10.00 g of PVA + 1.75 g of QUAT ®-188 containing 62.3% active ingredient

| Example | %, based on PVA Excess NaOH | H$_2$O | % N in the polymer after storing at 25° C. (convers. of QUAT ®-188) 2 days | 8 days | 14 days |
|---|---|---|---|---|---|
| 1 | 0.68 | 33.6 | 0.072 (9) | 0.08 (9) | — |
| 2 | 0.68 | 23.6 | 0.139 (17) | — | — |
| 3 | 0.68 | 18.6 | 0.138 (17) | — | — |
| 4 | 0.68 | 13.6 | 0.195 (24) | — | — |
| 5 | 0.68 | 11.1 | 0.186 (23) | — | 0.258 (32) |
| 6 | 0.68 | 9.6 | 0.160 (20) | — | — |
| 7 | 1.05 | 20.1 | 0.214 (27) | — | — |
| 8 | 1.05 | 14.5 | 0.259 (32) | — | — |
| 9 | 1.05 | 11.7 | 0.291 (36) | — | 0.365 (45) |
| 10 | 1.05 | 9.9 | 0.289 (36) | — | 0.364 (45) |
| 11 | 1.43 | 40.3 | 0.178 (22) | 0.255 (31) | — |
| 12 | 1.43 | 27.8 | 0.289 (36) | — | — |
| 13 | 1.43 | 21.6 | 0.290 (36) | — | — |
| 14 | 1.43 | 15.4 | 0.362 (45) | 0.398 (49) | — |
| 15 | 1.43 | 12.2 | 0.338 (42) | — | 0.393 (48) |
| 16 | 1.43 | 10.4 | 0.309 (38) | 0.481 (59) | 0.426 (53) |
| 17 | 1.88 | 30.4 | 0.309 (38) | — | — |
| 18 | 1.88 | 23.4 | 0.330 (41) | — | — |
| 19 | 1.88 | 16.4 | 0.345 (42) | — | — |
| 20 | 1.88 | 12.9 | 0.353 (43) | — | 0.461 (57) |
| 21 | 1.88 | 10.9 | 0.348 (43) | — | 0.461 (57) |
| 22 | 2.40 | 20.8 | 0.356 (44) | — | — |
| 23 | 2.40 | 17.6 | 0.280 (35) | — | — |
| 24 | 2.40 | 11.3 | 0.263 (33) | — | — |

Similar data are summarized in Table II. For these examples the excess NaOH was kept constant at 1.88%, based on the weight of PVA, but the ratio of the quaternizing agent was varied from 1.82 to 3.28 moles/100 equivalents of OH groups in the PVA.

TABLE II

QUATERNIZATION OF POLYVINYL ALCOHOL AT 25° C.
(10.0 g of PVA. Different amounts of QUAT ®-188)

| Example | %, H$_2$O Based on PVA | Moles QUAT ®-188 per 100 eq. of OH in PVA | % N in Polymer, after storing at 25° C. (convers. of QUAT ®-188) 2 days | 14 days |
|---|---|---|---|---|
| 25 | 24.8 | 1.82 | 0.247 (43) | — |
| 26 | 24.8 | 1.82 | 0.258 (44) | 0.256 (44) |
| 27 | 18.9 | 1.82 | 0.251 (43) | — |
| 28 | 15.4 | 1.82 | 0.245 (42) | — |
| 29 | 13.0 | 1.82 | 0.264 (46) | 0.240 (41) |

TABLE II-continued
QUATERNIZATION OF POLYVINYL ALCOHOL AT 25° C.
(10.0 g of PVA. Different amounts of QUAT ®-188)

| Example | %, H₂O Based on PVA | Moles QUAT ®-188 per 100 eq. of OH in PVA | % N in Polymer, after storing at 25° C. (convers. of QUAT ®-188) 2 days | 14 days |
| --- | --- | --- | --- | --- |
| 30 | 10.0 | 1.82 | 0.256 (44) | 0.236 (40) |
| 31 | 30.4 | 2.56 | 0.309 (38) | — |
| 32 | 23.4 | 2.56 | 0.330 (41) | — |
| 33 | 16.4 | 2.56 | 0.345 (43) | — |
| 34 | 12.9 | 2.56 | 0.353 (44) | 0.461 (57) |
| 35 | 10.9 | 2.56 | 0.348 (43) | 0.461 (57) |
| 36 | 27.9 | 3.28 | 0.362 (35) | — |
| 37 | 23.1 | 3.28 | 0.399 (38) | — |
| 38 | 15.8 | 3.28 | 0.450 (43) | 0.476 (45) |
| 39 | 13.3 | 3.28 | 0.436 (42) | 0.467 (44) |

The data in these tables indicate that, for best utilization of the quaternizing agent, the total amount of water should be about 11–13%, based on the weight of the PVA, and the excess of NaOH should be about 2%, again based on the weight of the PVA. The ratio of the quaternizing agent to PVA does not seem to be critical, although at lower concentrations the quaternizing agent seems to be used more efficiently.

EXAMPLES 40–42 AND COMPARATIVE EXAMPLES C1 TO C-3

In these examples, the effect of water is illustrated.

Two identical samples, A and B, were prepared by intimately mixing, as above, the following ingredients:

10.0 g dry PVA (medium molecular weight, fully hydrolyzed)
2.00 g QUAT ®-188 (60% active ingredient)
2.20 g 20% aqueous NaOH.

Each sample thus had 1.84% excess NaOH, and 2.81 equivalents quaternizing agent per 100 equivalents of —OH groups in the polymer. Sample A was dried for 10 minutes in a vacuum oven at 80° C., during which time 0.30 g water was lost. Sample B was dried, at ambient temperature under vacuum, for about 70 hours. It was substantially water-free. Samples A and B were heated, as indicated below. After heating, they were worked up in the same manner as described for examples 1–39. It is apparent that quaternization of PVA is enhanced by the presence of small amounts of water.

| Example | Portion | % Water | Heating Min. | °C. | % N in the PVA |
| --- | --- | --- | --- | --- | --- |
| 40 | A | 22.6 | 45 | 90 | 0.181 |
| C-1 | B | 0 | 45 | 90 | 0.087 |
| 41 | A | 22.6 | 120 | 95 | 0.166 |
| C-2 | B | 0 | 120 | 95 | 0.082 |
| 42 | A | 22.6 | 240 | 95 | 0.183 |
| C-3 | B | 0 | 240 | 95 | 0.092 |

Larger scale quaternization.

A 2 gallon (7.6 L) capacity Wellex mixer, equipped with jacket cooling, was used. Dry PVA powder was put into the mixing chamber, and the QUAT ®-188, as well as an aqueous solution of NaOH were added, while mixing, from a spray bottle. These additions, done in succession, usually took only a few minutes.

EXAMPLE 43

Ingredients:
PVA (High molecular weight, fully hydrolyzed)—2000 g
50% NaOH—150 g
62.3% QUAT ®-188—302 g Thus, this sample contained 1.75% excess NaOH, and 2.20 equivalents of quaternizing agent per 100 equivalents of -OH groups in the polymer. Samples were taken at 22, 32, 52, and 57 minutes of elapsed time (samples 1–4, respectively). After taking sample 4, the excess NaOH was neutralized in the mixer with 55 g of glacial acetic acid. Samples 1 through 4 were suspended, immediately after taking them from the mixer, in methanol containing a slight excess of HCl. The polymer was worked up as in examples 1–39. The reaction conditions and % conversion are shown in the table below:

| Elapsed time, min. | Reaction time, min. | Temp., °C. | RPM | Comments | % Convers. of QUAT ®-188 |
| --- | --- | --- | --- | --- | --- |
| 0 | — | 30 | 2400 | start to add NaOH | |
| 5 | — | 40 | " | NaOH all added | |
| 10 | — | 45 | " | start to add QUAT-188 | |
| 12 | 0 | 50 | " | QUAT-188 all added | |
| 22 | 10 | 50 | " | 0.209% N in PVA | 31 |
| 32 | 20 | 50 | " | 0.275% N in PVA | 41 |
| 42 | 30 | 60 | 1900 | 0.238% N in PVA | 35 |
| 57 | 45 | 53 | 2300 | 0.242% N in PVA | 36 |

EXAMPLE 44

Ingredients:
PVA (same as in Ex. 43)—2000 g
50% NaOH—143 g
62.3% QUAT ®-188—250 g Thus, the composition had 1.92% excess NaOH and 1.82 equivalents of quaternizing agent per 100 equivalents of polymer —OH groups. The procedure was similar to that of example 43, except that 60 g of glacial acetic acid was used for neutralizing and that somewhat higher temperatures were used. Samples were taken for analysis at 21, 31, 41, 51, 61, and 76 minutes of elapsed time. The conditions and results are seen in the table below:

| Elapsed time, min. | Reaction time, min. | Temp., °C. | RPM | Comments | % Convers. of QUAT ®-188 |
|---|---|---|---|---|---|
| 0 | — | 25 | 1500 | start to add NaOH | |
| 3 | — | 35 | " | QUAT-188 all added | |
| 12 | — | 45 | 1800 | start to add NaOH | |
| 16 | 0 | 55 | " | NaOH all added | |
| 21 | 5 | 65 | " | 0.091% N in PVA | 16 |
| 31 | 15 | 71 | " | 0.171% N in PVA | 30 |
| 41 | 25 | 76 | 1600 | 0.198% N in PVA | 35 |
| 51 | 35 | 78 | 1500 | 0.248% N in PVA | 44 |
| 61 | 45 | 78 | " | 0.203% N in PVA | 36 |
| 76 | 60 | 78 | " | 0.241% N in PVA | 43 |

It is apparent from these results that the quaternization takes place readily in a rather short time. The quaternized polymer remains a free-flowing powder.

We claim:

1. A process for the preparation of cationic polyvinyl alcohol, wherein dry polyvinyl alcohol powder is blended under high shear conditions at a temperature of about 0°–100° C. with an amount of water equal to about 5–50% of the weight of polyvinyl alcohol, a base, and a quaternizing agent represented by the following formula (1):

in which each one of $R_1$, $R_2$, and $R_3$, independently, is alkyl or substituted alkyl; $X^-$ is an anion; and $R_4$ is a halohydrin radical represented by formula (2):

where X, is a halide; $R_5$ is an alkylene radical; and Y is hydrogen or an alkyl radical;

the amount of the quaternizing agent being about 0.5 to 5 equivalents of X' halogen atoms per 100 equivalents of OH groups in the starting polyvinyl alcohol, and the amount of base being such that there is an excess of about 0.3 to 5 weight percent of the base, based on the weight of polyvinyl alcohol, over the amount of base required to completely convert the halohydrin radical to the oxirane form; both the starting polyvinyl alcohol and the resulting quaternized polyvinyl alcohol product remaining throughout the reaction essentially in the form of free-flowing powder or granular material;

and recovering the resulting quaternized polyvinyl alcohol.

2. The process of claim 1 wherein the amount of water is about 10–15% of the weight of polyvinyl alcohol.

3. The process of claim 2 wherein the amount of water is about 11–13% of the weight of polyvinyl alcohol.

4. The process of claim 1 wherein the base is sodium hydroxide and the excess of base is about 1.5–2.5% based on the weight of polyvinyl alcohol.

5. The process of claim 4 wherein the base is sodium hydroxide and the excess of base is about 1.7–2.0% based on the weight of polyvinyl alcohol.

6. The process of claim 1 which is carried out at a temperature of 25°–80° C.

7. The process of claim 1 wherein the quaternizing agent is a quaternary ammonium halide.

8. The process of claim 7 wherein the quaternizing agent is a quaternary ammonium chloride.

9. The process of claim 8 wherein $R_5$ in the quaternizing agent has 1 to 3 carbon atoms.

10. The process of claim 9 wherein the quaternizing agent is N-(3-chloro-2-hydroxypropyl)-N,N,N-trimethylammonium chloride.

11. The process of claim 11 wherein the amount of quaternizing agent is 1.5 to 2.5 equivalents of X' halogen atoms per 100 equivalents of polyvinyl alcohol hydroxyl groups.

12. The process of claim 11, wherein the quaternizing agent is N-(3-chloro-2-hydroxypropyl)-N,N,N-trimethylammonium chloride.

* * * * *

UNITED STATES PATENT AND TRADEMARK OFFICE
CERTIFICATE OF CORRECTION

PATENT NO. : 4,775,715
DATED : October 4, 1988
INVENTOR(S) : Aleksander Beresniewicz & Thomas Hassall, Jr.

It is certified that error appears in the above-identified patent and that said Letters Patent is hereby corrected as shown below:

Claim 1, Column 7, line 42, "where X," should be -- where X' --

Claim 11, Column 8, line 44, "Claim 11" should be -- Claim 1 --.

Signed and Sealed this

Thirty-first Day of January, 1989

Attest:

DONALD J. QUIGG

*Attesting Officer*　　　　*Commissioner of Patents and Trademarks*